(12) United States Patent
Shelton

(10) Patent No.: US 9,105,201 B1
(45) Date of Patent: Aug. 11, 2015

(54) BEHAVIOR MODIFICATION APPARATUS AND METHOD OF USE

(71) Applicant: Kenneth Shelton, Chico, CA (US)

(72) Inventor: Kenneth Shelton, Chico, CA (US)

( * ) Notice: Subject to any disclaimer, the term of this patent is extended or adjusted under 35 U.S.C. 154(b) by 252 days.

(21) Appl. No.: 13/886,773

(22) Filed: May 3, 2013

(51) Int. Cl.
G09B 19/00 (2006.01)
G09B 23/28 (2006.01)
G09B 29/00 (2006.01)
G07F 17/32 (2006.01)

(52) U.S. Cl.
CPC .............. *G09B 23/28* (2013.01); *G07F 17/32* (2013.01); *G09B 19/0076* (2013.01); *G09B 29/001* (2013.01); *A63F 2250/245* (2013.01); *G07F 17/3244* (2013.01); *G07F 17/3262* (2013.01); *G07F 17/3267* (2013.01)

(58) Field of Classification Search
CPC .. G09B 19/0076; G09B 29/001; G07F 17/32; G07F 17/3262; G07F 17/3244; G07F 17/3267; A63F 2250/245
USPC ......................................................... 434/238
See application file for complete search history.

(56) References Cited

U.S. PATENT DOCUMENTS

| | | | | |
|---|---|---|---|---|
| 5,675,426 A | * | 10/1997 | Meisner et al. | 348/838 |
| 5,853,327 A | * | 12/1998 | Gilboa | 463/39 |
| D458,303 S | * | 6/2002 | Daugherty | D19/20 |
| 7,229,333 B2 | * | 6/2007 | Barnesberger | 446/75 |
| 2003/0045204 A1 | * | 3/2003 | Chan | 446/397 |
| 2005/0042586 A1 | * | 2/2005 | Carpenter et al. | 434/238 |
| 2005/0183929 A1 | * | 8/2005 | Low et al. | 194/344 |
| 2006/0217169 A1 | * | 9/2006 | Manber | 463/16 |
| 2007/0160965 A1 | * | 7/2007 | Habing et al. | 434/236 |
| 2011/0053173 A1 | * | 3/2011 | Hood et al. | 435/7.1 |
| 2011/0189920 A1 | * | 8/2011 | Orozco | 446/129 |
| 2013/0119610 A1 | * | 5/2013 | Legary et al. | 273/348 |
| 2013/0309935 A1 | * | 11/2013 | Olson | 446/330 |
| 2014/0033990 A1 | * | 2/2014 | Brown et al. | 119/719 |

* cited by examiner

*Primary Examiner* — Jack Yip
(74) *Attorney, Agent, or Firm* — Gulf Coast Intellectual Property Group

(57) ABSTRACT

A behavioral modification system including an apparatus and a method of use thereof. The behavioral modification system further includes a locket and a plurality of milestone elements that are operable to be releasably secured to the locket. The locket further includes a central processing unit and an electromagnet disposed therein. A timing chip is circumferentially mounted to the plurality of milestone elements and is operably coupled with the central processing unit. A reward element is further included wherein the reward element is operable to provide access to the interior volume of the locket. The milestone elements and the reward elements are formed in the shape of keys and function to provide physical representations of achieved goals directed toward a behavior change.

14 Claims, 3 Drawing Sheets

BEHAVIOR MODIFICATION APPARATUS AND METHOD OF USE

FIELD OF THE INVENTION

The present invention relates generally to a behavior modification system, more specifically but not by way of limitation, a reward apparatus operable to assist a user in the accomplishment of a behavioral change wherein the reward apparatus includes visual elements to represent the desired accomplishment.

BACKGROUND

Human behavior is a range of traits, characteristics and reactions that are exhibited by humans wherein the behaviors are influenced by factors such as but not limited to culture, emotions, values and attitudes. Depending upon the social parameters behavior typically falls either within or outside of socially acceptable parameters. Human behavior is experienced in different stages throughout a lifetime and different behavioral traits are exhibited at different stages throughout an individuals development.

Once an individual has reached adulthood behavioral traits are typically engrained. Some of the traits or patterns can lead to negative consequences such as but not limited to substance abuse or weight gain. Negative behavioral traits influence the behavioral symptoms such as the aforementioned and can lead to many types of problems within the individual's life that ultimately affects their relationships, self-esteem and many other parameters of their lives. Individuals will routinely attempt to correct a behavioral trait that is resulting in an undesirable symptom such as but not limited to weight gain. Conventional methods of behavioral modification include counseling and/or group therapy wherein the individual will work with a professional to diagnose the root cause of the behavior and attempt to assist the individual in directing a change in that behavior so as to produce a desired outcome.

One issue with conventional counseling or group therapy is the lack of a reward element or visual reminder of an achieved goal or objective. During conventional counseling or group therapy providing motivation of the individual and acknowledgement of their accomplished tasks or objectives provide a greater probability of success. A basic desire for humans is to receive a reward or some sort of gratification for achieving an objective or milestone during their process of altering a behavior to achieve a desired result. While counseling and/or group therapy has proven to be effective offering a reward element that provided visual signals of milestone accomplishments and further providing an achievement reward objective would significantly improve desired behavioral modification and drive results.

SUMMARY OF THE INVENTION

It is the object of the present invention to provide a behavior modification reward system that includes a locket having a plurality of milestone elements that are operable to represent an achieved objective or milestone during a behavioral modification.

Another object of the present invention is to provide a behavior modification reward system wherein the plurality of milestone elements are operably engaged with the locket.

Still a further object of the present invention is to provide a behavior modification system having a first category of milestone elements and a second category of milestone elements.

An additional object of the present invention is to provide a behavior modification system wherein the milestone elements are fashioned in the form of keys.

Another object of the present invention is to provide a behavior modification system wherein the milestone elements further include a timing unit that allows the milestone element to be programmed so as to set a desired timeline to accomplish a desired objective.

Yet a further object of the present invention is to provide a behavior modification system wherein the second category of milestone elements is in the form of a key and wherein the second category of milestone element represents accomplishment of a desired objective.

Still an additional object of the present invention is to provide a behavior modification system wherein the second category of milestone elements is operable to provide access to the internal volume of the locket.

A further object of the present invention is to provide a behavior modification system that further includes a reward element disposed within the locket wherein access to the reward element is provided only by the second category of milestone element.

Yet another object of the present invention is to provide a behavior modification system that further includes a website wherein the website is operable to facilitate the process of use of the behavior modification system.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
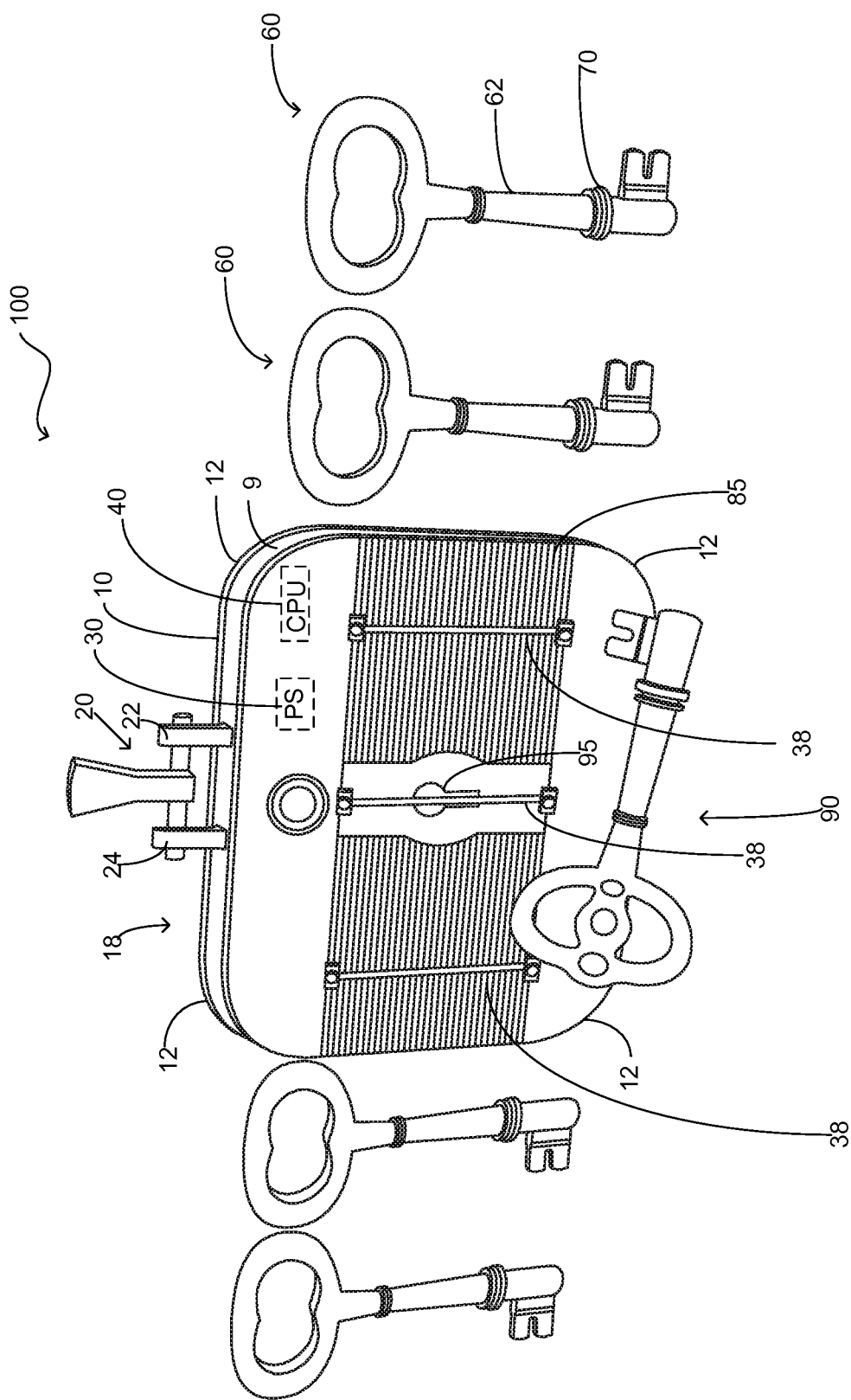
FIG. 1 is a perspective view of an embodiment of the present invention.

Referring now to the drawings submitted herewith, wherein various elements depicted therein are not necessarily drawn to scale and wherein through the views and figures like elements are referenced with identical reference numerals, there is illustrated a behavior modification system 100 constructed according to the principles of the present invention.

The behavior modification system 100 includes a body 10 that is generally rectangular in shape having rounded corners 12 including a plurality of integrally formed walls 14 forming an interior volume. The body 10 is manufactured from a suitable durable material such as but not limited to metal. The body 10 includes a front wall 16 that is hingedly attached using suitable mechanical fasteners so as to provide access to the interior volume of the body 10. Attached to the body 10 proximate the upper end 18 is a fastener 20. The fastener 20 includes a first bracket 22 and a second bracket 24 that are generally parallel extending outward from the upper end 18 of the body 10. Intermediate the first bracket 22 and second bracket 24 is rod 26. The rod 26 is movably mounted intermediate the first bracket 22 and second bracket 24 so as to allow the body 10 to pivotally move with respect to the fastener 20. An interface coupling 28 is secured to the rod 26 utilizing suitable durable techniques. The interface coupling 28 facilitates the operable connection of the body 10 to an element of costume jewelry such as but not limited to a necklace or bracelet chain. It is contemplated within the scope of the present invention that the body 10 is worn by the user during use of the behavior modification system 100 as further described herein. While it is contemplated within the scope of the present invention that the body 10 of the behavior modification system 100 is worn as costume jewelry during use thereof, it is further contemplated within the scope of the present invention that the body 10 could be stored in a desirable location and accessed upon need by a user. Furthermore, while disclosed herein in a preferred embodiment the body 10 resembles a jewelry locket, it is additionally contemplated within the scope of the present invention that the body 10 could be configured to be an ornamental representation of many kinds More specifically but not by way of limitation, it is contemplated within the scope of the present invention that the body 10 could be formed to resemble a fractional portion of a brick wall having a window with jail-style bars thereon.

As shown in FIG. 1 herein, the body 10 has disposed therein a power supply 30. The power supply 30 is a conventional power supply such as but not limited to a lithium ion battery. The power supply 30 function to provide the necessary power to operate the central processing unit 40 and is operably coupled thereto. The central processing unit 40 is disposed within the body 10 adjacent to the power supply 30. The central processing unit 40 includes the necessary electronics to receive, store, transmit and manipulate data. While not particularly illustrated herein, it is contemplated within the scope of the present invention that the central processing unit 40 can be operably coupled to a conventional computing device such as but not limited to a tablet pc or smart phone. While no particular technique of operable connection between the central processing unit 40 and a computing device is required, it is contemplated within the scope of the present invention that the central processing unit could be coupled to a computing device using a USB port or wireless technique such as but not limited to Bluetooth. The operable connection of the central processing unit 40 to a computing device facilitates the programming thereof as further discussed herein in the method of use.

The behavior modification system 100 further includes a plurality of milestone elements 60. The milestone elements 60 include a body 62 that is shaped in the form of a key. The milestone elements 60 are manufactured from a suitable durable material such as but not limited to metal, and have at least a portion thereof that is ferromagnetic. While in the preferred embodiment of the behavior modification system 100 the milestone elements 60 have been formed in the shape of a key, it is contemplated within the scope of the present invention that milestone elements 60 could be formed in numerous different shapes. The milestone elements 60 function to provide physical representation of an objective or goal that is desired to be accomplished and/or completed by a user of the behavior modification system 100. By way of example but not limitation, the milestone elements 60 could be used as physical representation of a goal such as but not limited to weight loss or chemical substance abuse. While there are four milestone elements 60 illustrated herein, it is contemplated within the scope of the present invention that the behavior modification system 100 could have any number of milestone elements 60 as a part thereof.

The milestone elements 60 are operable to be journaled into the body 10 via apertures 69 located in the sidewalls 9. During use of the behavior modification system 100, once a user has accomplished a particular objective and/or goal that is represented by one of the milestone elements 60, the user will insert the milestone element 60 into the body 10 whereupon insertion of the milestone element 60 into the body 10 releasably secures the milestone element at least partially within the interior volume of the body 10. The milestone element 60 further includes a timing chip 70. The timing chip 70 is circumferentially mounted to the body 62 of the milestone element 60. The timing chip 70 is a conventional electronic semiconductor chip having the necessary electronics to store, receive, manipulate and transmit data. The timing chip 70 is communicably coupled to the central processing unit 40 utilizing suitable techniques such as but not limited to Bluetooth or similar technology. The timing chip 70 functions to monitor and track the time required to complete an objective and/or goal represented by the milestone element 60 for the user of the behavioral modification system 100. The timing chip 70 is initially programmed utilizing the central processing unit 40 with a term in which the user of the behavior modification system 100 is required to complete an objective and/or goal that the milestone element 60 represents. As previously mentioned herein, ensuing completion of the objective and/or goal the user will insert the milestone element 60 into the body 10. If the timing chip 70 has recorded a time that is greater than the initial programmed time period required for the completion of the objective and/or goal by the user, the central processing unit 40 will not place the electromagnets 85 in an on position so as to assist in releasably securing the milestone element 60 into the body 10. The electromagnets 85 are disposed across the body 10 in a generally lateral pattern and are conventional electromagnets having a first position and a second position. The electromagnets 85 are operably coupled with the central processing unit 40 and the power supply 30 and in the first position the electromagnets 85 have current flow from the power supply so as to provide securing of the milestone element 60 subsequent the milestone element 60 being journaled into the body 10 and wherein the timing chip 70 has communicated with the central processing unit that the programmed term has not expired. In its second position, the electromagnets 85 have no current from the power supply 30. In the second position, the electromagnets 85 are not magnetized as the central processing unit 40 has detected the duration programmed into the timing chip 70 has expired upon insertion into the body 10. Those skilled in the art will recognize that the milestone elements 60 could be releasably secured using other suitable technologies that inhibit the milestone element 60 from being releasably secured into the body 10 subsequent the expiration of a programmed time period into the timing chip 70.

A reward element 90 is further included in the behavior modification system 100. The reward element 90 includes a body 91 that is formed in the shape of a key. The reward element 90 functions to engage aperture 95 and provide access to the interior of the body 10. The aperture 95 has disposed thereacross a bar 38 that is operable to be removed subsequent insertion of all of the milestone elements 60 into the body 10. While three bars 38 are illustrated herein, it is contemplated within the scope of the present invention that any number of bars 38 could be included with the body 10. The reward element 95 functions to provide access to a reward (not illustrated herein) that can be disposed within the interior volume of the body 10. Subsequent insertion of all of the milestone elements 60 into the body 10, the aperture 95 is placed in an open position whereupon the reward element 90 can be inserted therein so as to provide access to the interior volume of the body 10. It is contemplated within the scope of the present invention that a second user such as but not limited to a mentor, has possession of the reward element 90 and upon completion of the objectives and/or goals by the first user and successful insertion of the milestone elements 60 into the body 10 representing the aforementioned goals and/or objectives, the second user will journal the reward element 90 into the aperture 95 providing access to an item of desire or reward that is disposed within the interior volume of the body 10. Those skilled in the art will recognize that numerous types of item(s) could be disposed within the interior volume of the body 10 such as but not limited to jewelry or collectible medallion.

Figure 2:
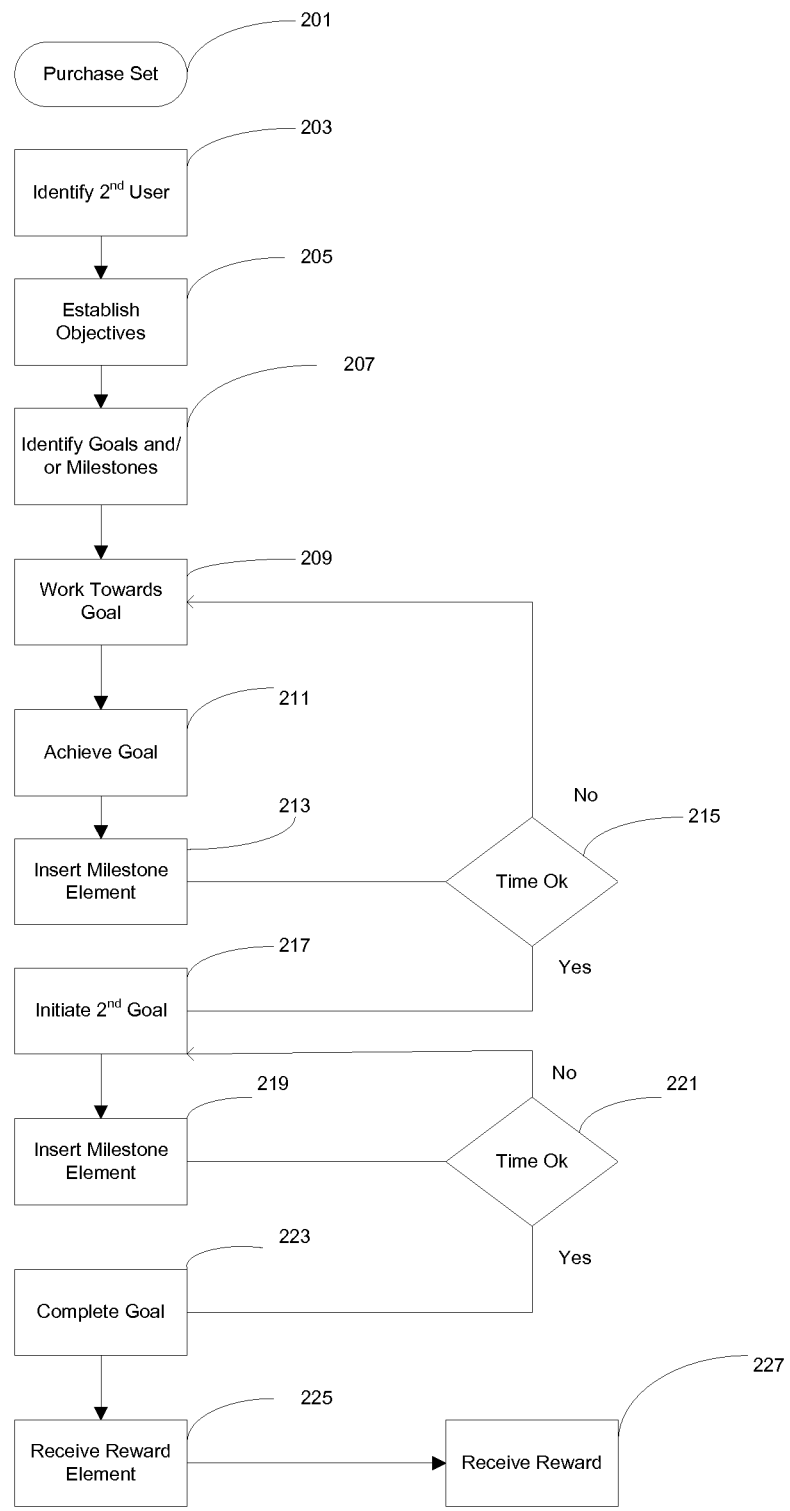
FIG. 2 is a diagrammatic view of the method of use of the present invention.
Figure 3:
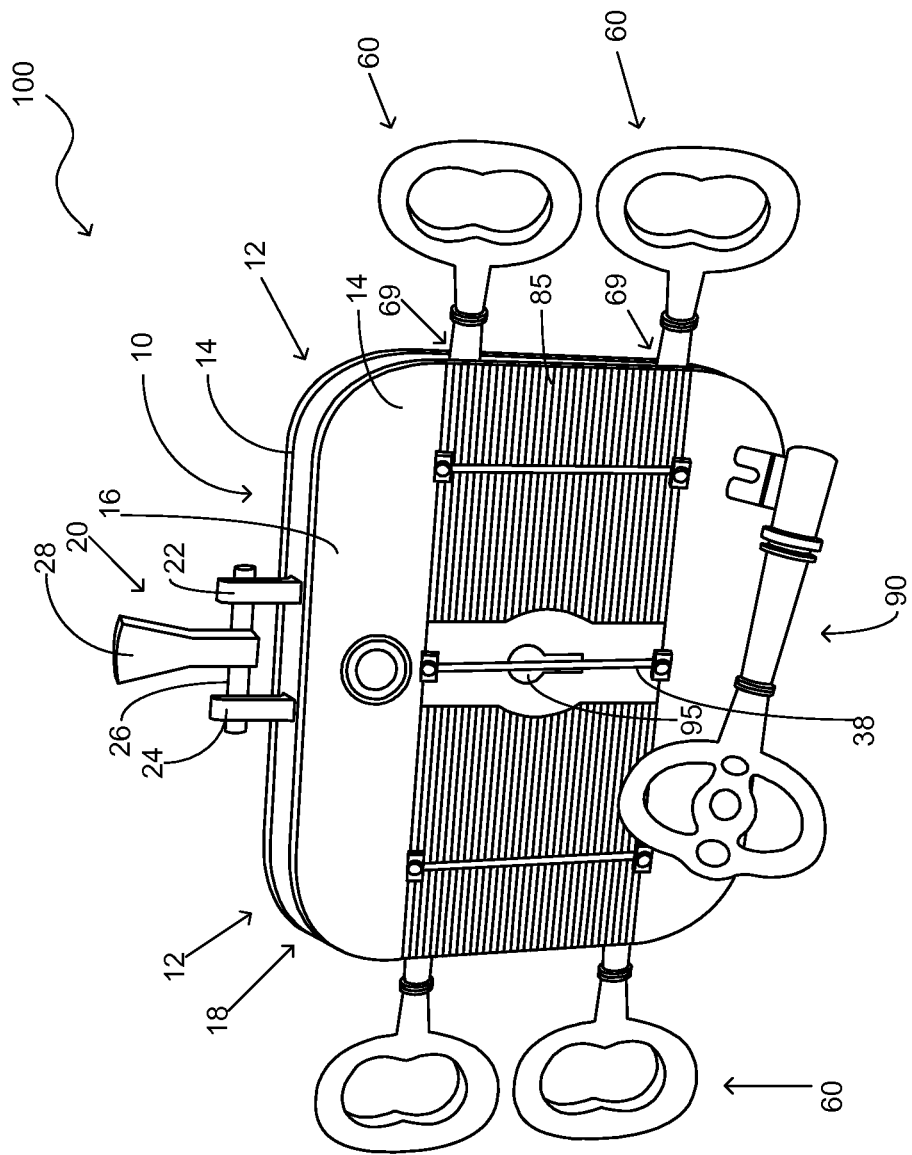
FIG. 3 is a perspective view of an embodiment of the present invention with the milestone elements journaled into the body.

Referring in particular to FIG. 2 herein, a method of use of the behavior modification system 100 is illustrated therein. In Step 201, a first user will purchase the behavior modification system 100 via an appropriate channel such as but not limited to a website. Subsequent to purchasing a behavior modification system 100 the first user will identify a second user in step 203. A second user will be a mentor and/or coach to the first user and provide assistance in achieving a desired behavior modification. In step 205, the first user will collaborate with the second user so as to establish objectives for behavior modification of the first user such as but not limited to a healthy lifestyle. In step 207, the first user and the second user identify the goals and/or milestones required to achieve the objective identified in step 205. Additionally, in step 207 the duration to accomplish each goal and/or milestone is agreed upon and programmed into the appropriate quantity of milestone elements 60 and timing chips thereof via the central processing unit 40. Additionally, during step 207, the first user will provide the second user with the reward element 90. In step 209, the first user will commence efforts in order to accomplish the first goal and/or milestone of the established objective set in step 205. In step 211, the first user has completed a first goal and/or milestone identified in step 207 and will insert a milestone element 60 into the body 60. In step 215, the timing chip 70 communicates with the central processing unit 40 subsequent insertion into the body 10 in step 213 and determines if the programmed time has been exceeded. If the programmed time has expired then the milestone element 60 is not releasably secured into the body 10 and the user must return to step 209. If the time programmed into the timing chip 70 has not expired then the milestone element 60 is releasably secured at least partially within the body 10 by the electromagnets 85.

In step 217, the first user will initiate a second milestone and/or goal in order to achieve the objective established in step 205. Step 219, includes insertion of the second milestone element 60 into the body 10 ensuing accomplishment of the milestone and/or goal. Step 221, is similar to step 215 wherein the time required to complete the identified milestone and/or goal is verified by the timing chip 70 and the central processing unit 40. If the time required to complete the milestone and/or goal has not expired the second milestone element 60 will be releasably secured at least partially within the body 10. Subsequent step 221, the user will reach step 223. For exemplary purposes only two milestone and/or goals have been used. It is contemplated within the scope of the present invention that any number of milestone and/or goals could be identified by the first and second user and the appropriate number of milestone elements would be provided. In step 223, the first user has completed all of the milestone and/or goals of the established objective of step 205. In step 225 the first user will receive the reward element 90 from the second user. In step 227, the first user will utilize the reward element 90 to gain access to the interior volume of the body of the behavior modification system 100 and receive an object disposed therein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A behavior modification apparatus operable to provide physical representation of objectives that require accomplishment in order to change the behavior of a user comprising:

a body, said body being an ornamental representation of an object, said body having a plurality of integrally formed walls forming an interior volume, said body having a first side and a second side, said body further including a front wall, said front wall having a first aperture mounted centrally therein, said body further including at least one aperture in said first side;

a central processing unit, said central processing unit being disposed within said interior volume of said body, said central processing unit having the necessary electronic to receive, store, manipulate and transmit data;

a power supply, said power supply being disposed within said interior volume of said body, said power supply being operably coupled to said central processing unit;

an electromagnet, said electromagnet being secured to said front wall;

at least one milestone element, said at least one milestone element operable to represent a goal required to achieve a behavior trait, said at least one milestone element being releasably secured to said body, said at least one milestone element further including a timing chip, said timing chip being operably coupled to said central processing unit, said timing chip programmable so as to facilitate the monitoring of time required to achieve a goal represented by said milestone element, wherein said timing chip operates in a first mode and a second mode, in said first mode said timing chip allows said milestone element to be releasably secured within said body, said timing chip in said first mode operable to transmit a signal to said central processing unit so as to place said electromagnet in a first position wherein in said first position said electromagnet has current applied thereto by said power supply; and a reward element, said reward element operable to engage said first aperture so as to provide access to the interior volume of said body.

2. The behavior modification apparatus as recited in claim 1, wherein said at least one milestone element is manufactured having at least a portion thereof being ferromagnetic.

3. The behavior modification apparatus as recited in claim 2, wherein said reward element is not operable to provide access to the interior volume of said body until said at least one milestone element is releasably secured to said body.

4. The behavior modification apparatus as recited in claim 3, wherein said reward element and said milestone element are shaped so as to resemble a key.

5. A method for facilitating a behavioral change for a user comprising the steps of:
purchasing a behavioral modification apparatus, wherein said behavioral modification apparatus includes an ornamental representation of an object and a plurality of milestone elements;
identifying a first user and a second user of the behavioral modification apparatus;
ascertaining a behavior of a first user wherein the first user desires to change;
establishing objectives required to change the behavior;
identifying a plurality of milestones required to be achieved en route to changing the behavior of the first user;
commencing progress towards a first milestone of said plurality of milestones;
measuring the time required to achieve the first milestone;
achieving said first milestone;
receiving a milestone element upon achievement of said first milestone, wherein said milestone element further includes a timing chip;
inserting said milestone element into a locket, said locket further including an electromagnet, said electromagnet being operably coupled with said milestone elements;
initiating a second milestone of said plurality of milestones;
achieving said second milestone;
receiving a second milestone element;
securing said second milestone element into said locket;
receiving a reward element, wherein said reward element is provided by said second user;
utilizing said reward element to open said locket;
programming a time into said milestone element;
verifying that the milestone element is inserted into said locket prior to expiration of the time programmed into said milestone element; and
wherein the locket further includes an reward object stored therein to symbolize the accomplishment of a behavioral change for the first user.

6. The method for facilitating a behavioral change as recited in claim 5, wherein said milestone elements have a portion thereof that is ferromagnetic.

7. The method for facilitating a behavioral change as recited in claim 6, wherein said locket further includes an electromagnet, said electromagnet being operably coupled with said milestone elements.

8. The method for facilitating a behavioral change as recited in claim 7, wherein said milestone elements are shaped in the form of keys.

9. A method for facilitating a behavioral change for a user comprising the steps of:
purchasing a behavioral modification apparatus, wherein said behavioral modification apparatus includes an ornamental representation of an object and a plurality of milestone elements, a locket having a body that is generally rectangular in shape having rounded corners, said locket having an interior volume, said locket having a front wall and a rear wall, said body having a first side wall and a second side wall, said body having a plurality of apertures in said first side wall and said second side wall, said body further including a central processing unit and a power supply disposed within the interior volume, wherein the behavioral modification system includes a plurality of milestone elements and a reward element;
identifying a first user of the behavior modification system;
locating a second user of the behavioral modification apparatus, wherein the second user is a mentor to the first user during the use of the behavior modification system;
ascertaining a behavior of a first user wherein the first user desires to change;
establishing objectives required to change the behavior;
identifying a plurality of milestones required to be achieved en route to changing the ascertained behavior of the first user;
establishing a timeline for the achievement of the plurality of milestones required to complete a behavioral change;
programming said plurality of milestone elements with the established timeline;
commencing progress towards a first milestone of said plurality of milestones;
achieving said first milestone;
receiving a first milestone element upon achievement of said first milestone, wherein said first milestone element further includes a timing chip;
inserting said first milestone element into said locket, wherein said first milestone element will be releasably secured into said body of the locket upon said first milestone element being inserted prior to expiration of the programmed timeline;
initiating a second milestone of said plurality of milestones;
commencing progress towards the second milestone of said plurality of milestones;
achieving said second milestone;
receiving a second milestone element upon achievement of said second milestone, wherein said second milestone element further includes a timing chip;
inserting said second milestone element into said locket, wherein said second milestone element will be releasably secured into said body of the locket upon said second milestone element being inserted prior to expiration of the programmed timeline;
completing the plurality of milestones required to change the desired behavior;
receiving a reward element, wherein said reward element is provided by said second user;
utilizing said reward element to open said locket; and
wherein the locket further includes an reward object stored therein to symbolize the accomplishment of a behavioral change for the first user.

10. The method for facilitating a behavioral change as recited in claim 9, wherein said locket further includes an electromagnet, said electromagnet operably coupled to said central processing unit, said electromagnet present in said front wall of said body, said electromagnet operably coupled with said plurality of milestone elements.

11. The method for facilitating a behavioral change as recited in claim 10, wherein said milestone elements have a portion thereof that is ferromagnetic.

12. The method for facilitating a behavioral change as recited in claim 11, wherein said milestone elements are shaped in the form of keys.

13. The method for facilitating a behavioral change as recited in claim 12, wherein the timing chip is circumferentially mounted to the milestone elements and is operably coupled with the central processing unit.

14. The method for facilitating a behavioral change as recited in claim 13, wherein the reward element is formed in the shape of a key.

\* \* \* \* \*